(12) United States Patent
Istfan

(10) Patent No.: US 8,626,590 B2
(45) Date of Patent: Jan. 7, 2014

(54) METHODS, SYSTEMS, AND COMPUTER PROGRAM PRODUCTS FOR AUTOMATIC GROUP ORDERING OF FOOD FROM RESTAURANTS

(76) Inventor: George Lee Istfan, Cary, NC (US)

( * ) Notice: Subject to any disclaimer, the term of this patent is extended or adjusted under 35 U.S.C. 154(b) by 622 days.

(21) Appl. No.: 11/616,165

(22) Filed: Dec. 26, 2006

(65) Prior Publication Data

US 2007/0203801 A1    Aug. 30, 2007

Related U.S. Application Data

(60) Provisional application No. 60/753,514, filed on Dec. 23, 2005.

(51) Int. Cl.
*G06Q 30/00* (2012.01)

(52) U.S. Cl.
USPC .............. 705/15; 705/21; 705/26.8; 705/27.1

(58) Field of Classification Search
USPC ......................................................... 705/1, 9
See application file for complete search history.

(56) References Cited

U.S. PATENT DOCUMENTS

| | | | |
|---|---|---|---|
| 5,235,509 A | | 8/1993 | Mueller et al. |
| 5,991,739 A | | 11/1999 | Cupps et al. |
| 6,026,375 A | | 2/2000 | Hall et al. |
| 6,473,739 B1 | | 10/2002 | Showghi et al. |
| 6,574,603 B1 | | 6/2003 | Dickson et al. |
| 6,618,062 B1 | | 9/2003 | Brown et al. |
| 6,801,228 B2 | | 10/2004 | Kargman |
| 2002/0007321 A1 * | 1/2002 | Burton ............................. 705/26 |
| 2002/0055878 A1 | | 5/2002 | Burton et al. |
| 2002/0198790 A1 | | 12/2002 | Paulo et al. |
| 2003/0065565 A1 | | 4/2003 | Wagner et al. |
| 2003/0078793 A1 * | 4/2003 | Toth ................................. 705/1 |
| 2003/0126016 A1 | | 7/2003 | Asano |
| 2003/0167208 A1 | | 9/2003 | La Mastro |
| 2004/0035644 A1 | | 2/2004 | Ford et al. |
| 2004/0044578 A1 | | 3/2004 | Kim et al. |
| 2004/0044579 A1 | | 3/2004 | Leutze et al. |
| 2004/0073449 A1 | | 4/2004 | Yang |
| 2004/0177008 A1 | | 9/2004 | Yang |
| 2006/0053061 A1 * | 3/2006 | Evans ............................ 705/15 |
| 2006/0173754 A1 * | 8/2006 | Burton et al. .................... 705/27 |
| 2006/0200374 A1 * | 9/2006 | Nelken ............................. 705/9 |

(Continued)

OTHER PUBLICATIONS http://web.archive.org/web/20040606070502/http://www.diningin.com/.*

(Continued)

*Primary Examiner* — Ryan Zeender
*Assistant Examiner* — Dana Amsdell
(74) *Attorney, Agent, or Firm* — Jenkins, Wilson, Taylor & Hunt, P.A.

(57) ABSTRACT

The subject matter described herein includes methods, systems, and computer program products for automatic online group ordering of food from a restaurant. According to one method, input for creating a group online food order from a restaurant is received. The input defines a group of individuals to invite to participate in an online group food order from a restaurant is received. In response to the input, invitations are automatically and electronically sent to the individuals inviting the individuals to participate in the group order. Individual orders are received from at least some of the individuals. The individual orders are combined into a group order. The group order is automatically communicated to the restaurant.

27 Claims, 11 Drawing Sheets

(56) References Cited

U.S. PATENT DOCUMENTS

| | | | |
|---|---|---|---|
| 2006/0206390 A1* | 9/2006 | Asano | 705/26 |
| 2006/0293965 A1* | 12/2006 | Burton | 705/26 |
| 2007/0094065 A1* | 4/2007 | Wu et al. | 705/9 |
| 2007/0150321 A1* | 6/2007 | Zhao et al. | 705/5 |
| 2007/0265921 A1 | 11/2007 | Rempe et al. | |
| 2007/0288546 A1* | 12/2007 | Rosenberg | 709/201 |
| 2008/0172460 A1 | 7/2008 | Anderson | |

OTHER PUBLICATIONS

Web page archive and representative printout from ehungry.com web site (Nov. 30, 2004).

Internet Archive WaybackMachine printout (Jun. 12, 2007).

Internet Archive WaybackMachine printout for www.jasonsdeli.com (Jun. 12, 2007).

Declaration of George Lee Istfan (Aug. 8, 2007).

Internet Archive WaybackMachine printout for www.ordertalk.com (Oct. 30, 2009).

"OrderTalk," Online Order Management, http://web.archive.org/web/20050518004134/www.ordertalk.com/web/default.aspx, pp. 2, (May 18, 2005).

Email from Patrick.Eldon@ordertalk.com to sales@novadine.com (Mar. 16, 2009).

* cited by examiner

FIG. 5

| Groups | User Profile | Credit Card | Order History |

Group Ordering Section (optional)

Select Group [Engineering ▼]   [Delete Group] [Add Group]

Undefined Members

Current Members in Group

◄ ▓ ►        ◄ ▓ ►

[>] [>>] [<] [<<]

Member Detail
- First Name
- Last Name
- Email

[Add to Group] [Modify]

[Save Group]

[Remove All]
[Remove selected]

FIG. 6

Stacy Parker
_____

From:       gistfan@mealportal.com
Sent:       Thursday, February 17, 2005 9:57 AM
To:         Stacy Parker
Subject:    Group Order from Demo --------------
You have been invited to join a group order from Demo initiated by George Istfan.

You will need to pay for your order when you place it.

The cut off time for you to place your order is 02/17/05 01:15 PM. Please go here to place your order: http://demo.mealportal.com/grouping.cfm?id=401

FIG. 7

Stacy Parker
_____

From:       gistfan@mealportal.com
Sent:       Thursday, February 03, 2005 9:03 AM
To:         Stacy Parker
Subject:    Group Order from Demo -------------
You have been invited to join a group order from Demo initiated by George Istfan.

Your order is already paid for.

The cut off time for you to place your order is 02/03/05 12:30 PM. Please go here to place your order: http://steakout.mealportal.com/grouping.cfm?id=287

---
Incoming mail is certified Virus Free.
Checked by AVG anti-virus system (http://www.grisoft.com).
Version: 6.0.841 / Virus Database: 572 - Release Date: 1/21/2005

METHODS, SYSTEMS, AND COMPUTER PROGRAM PRODUCTS FOR AUTOMATIC GROUP ORDERING OF FOOD FROM RESTAURANTS

RELATED APPLICATIONS

This application claims the benefit of U.S. Provisional Patent Application Ser. No. 60/753,514, filed Dec. 23, 2005; the disclosure of which is incorporated herein by reference in its entirety.

TECHNICAL FIELD

The subject matter described herein relates to online ordering of food from a restaurant. More particularly, the subject matter described herein relates to methods, systems, and computer program products for automatic online group ordering of food from restaurants.

BACKGROUND

Restaurants have long offered the convenience of allowing patrons to place food orders prior to entering the restaurant for dine-in, carry-out, and delivery orders. Traditionally, such orders were placed over the telephone. In this traditional method, a single individual seeking to place an order for a group of individuals determines what each individual wants from a menu, places the combined order via the telephone, and pays for the order. This conventional method has a number of disadvantages. For example, a single individual is required to determine what each participant in the order wants to eat, to manually combine the order, and to place the combined order. In addition, the order creator is required to pay for the order and either seek payment from order participants in advance of the order or after the order has been placed.

With the proliferation of the Internet, online ordering systems have been developed. For example, individual restaurants have allowed patrons to place orders online. An individual typically goes to a restaurant's website, places the order and either picks up the order or has the order delivered. While online ordering eliminates the need to use the telephone, the order must still be manually combined, placed, and paid for by the order initiator.

E-commerce systems aimed at facilitating group orders likewise require manual intervention by the order initiator to complete the group order. For example, one system requires the order initiator to review and submit individual orders that are placed as part of a group order. Such a system is unsuitable for food orders where the order creator may be unavailable at the cut-off time of the group order but may wish the order to be completed in his or her absence.

Another problem with conventional e-commerce systems is that they lack payment flexibility. For example, conventional e-commerce systems require payment for individual transactions to be made at the time the transactions occur, whether for individual or group orders. There is no capability of optionally allowing the creator or the individuals to pay for a group order.

Accordingly, there exists a long felt need for methods, systems, and computer program products for automatic online group ordering of food from a restaurant.

SUMMARY

The subject matter described herein includes methods, systems, and computer program products for automatic online group ordering of food from a restaurant. According to one method, input for creating a group online food order from a restaurant is received. The input defines a group of individuals to invite to participate in the group food order. In response to the input, invitations are automatically and electronically sent to the individuals inviting the individuals to participate in the group order. Individual orders are received from at least some of the individuals. The individual orders are combined into a group order. The group order is automatically communicated to the restaurant.

According to another aspect, a method for online group ordering of food from a restaurant is provided. The method includes receiving input for creating a group online food order from a restaurant, the input defining group of individuals to invite to participate in the group order and a cutoff time for the order. An order creator is presented with an option to pay for the group order or to allow the individuals to pay for their respective portions of the group order.

Input is received from the order creator selecting the option to pay for the group order. Invitations are automatically and electronically sent to the individuals inviting the individuals to participate in the group order. Individual orders are received from at least some of the individuals. The individual orders are combined into the group order. In response to occurrence of the cutoff time, the order creator is allowed review and pay for the group order. The group order is communicated to the restaurant.

The subject matter described herein may be implemented using an Internet-based computer program product comprising computer executable instructions embodied in a computer-readable medium. Exemplary computer-readable media suitable for implementing the subject matter described herein include chip memory devices, disk memory devices, programmable logic devices, and application specific integrated circuits. In addition, a computer-readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which:

FIG. 5 is a drawing of an exemplary user computer user interface screen for creating a group online food order according to an embodiment of the subject matter described herein;

FIG. 6 is a drawing of an exemplary computer user interface screen for creating a group for a group online food order according to an embodiment of the subject matter described herein;

FIG. 7 is an exemplary email message inviting a participant to participate in a group order where the participant pays for his or her individual order according to an embodiment of the subject matter described herein;

FIG. 8 is an exemplary email message inviting an individual to participate in a group order where the order has been paid for by the group order creator according to an embodiment of the subject matter described herein;

FIG. 10 is a drawing of a computer user interface screen for allowing an individual to input his or her ordering preferences according to an embodiment of the subject matter described herein.

DETAILED DESCRIPTION

Figure 1:
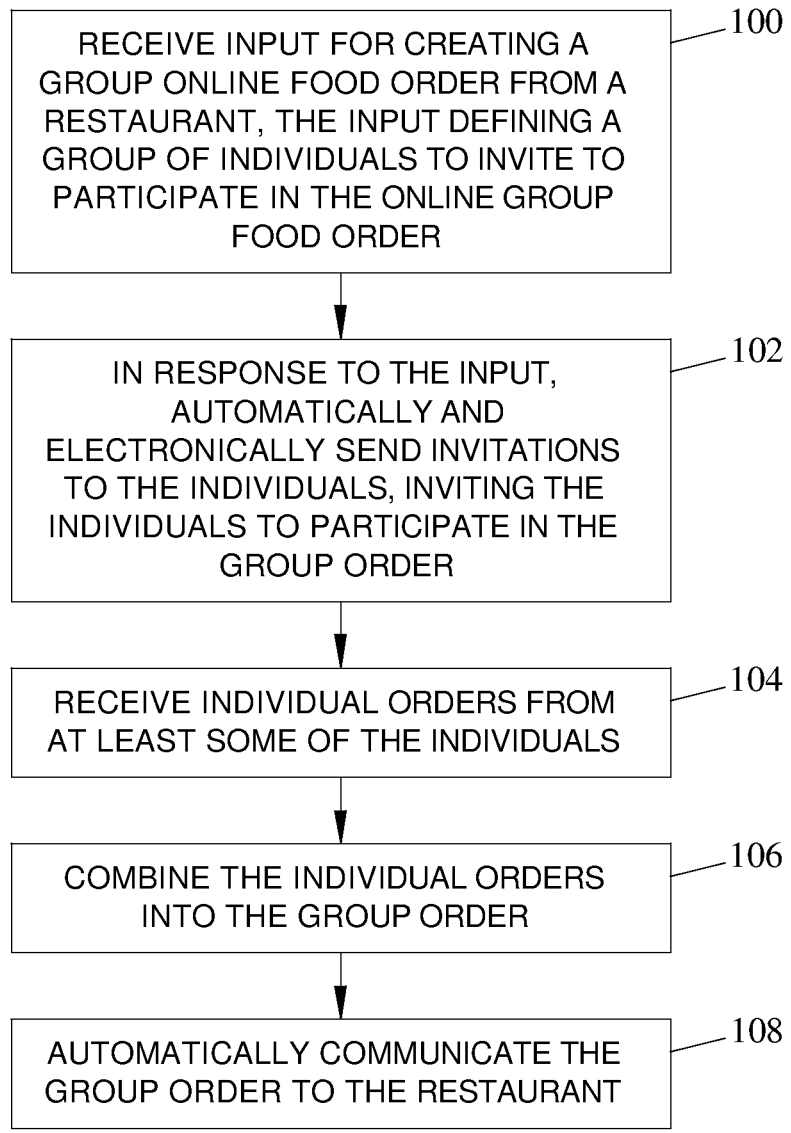
FIG. 1 is a flow chart illustrating an exemplary automatic online group food ordering process according to an embodiment of the subject matter described herein.

The subject matter described herein includes methods, systems, and computer program products for automatic online group ordering of food from a restaurant. FIG. 1 is a flow chart of an exemplary process for automatic online group ordering of food from a restaurant according to an embodiment of the subject matter described herein. Referring to FIG. 1, in step 100, input for creating a group online food order from a restaurant is received. The input defines a group of individuals to invite to participate in the group order. For example, in FIG. 2, a system 200 for automatic online group ordering of food from a restaurant includes a group ordering server 202 that receives input from an individual terminal 204 defining a group of individuals to participate in a food order. As will be described in more detail below, the group of individuals may be any group of individuals specified by the order creator. For example, the group may be a group of employees in a single office or distributed across multiple offices or geographic locations. A group manager 206 receives the order definition. The order definition specifies the individuals and the restaurant to which the order should be placed.

Figure 2:
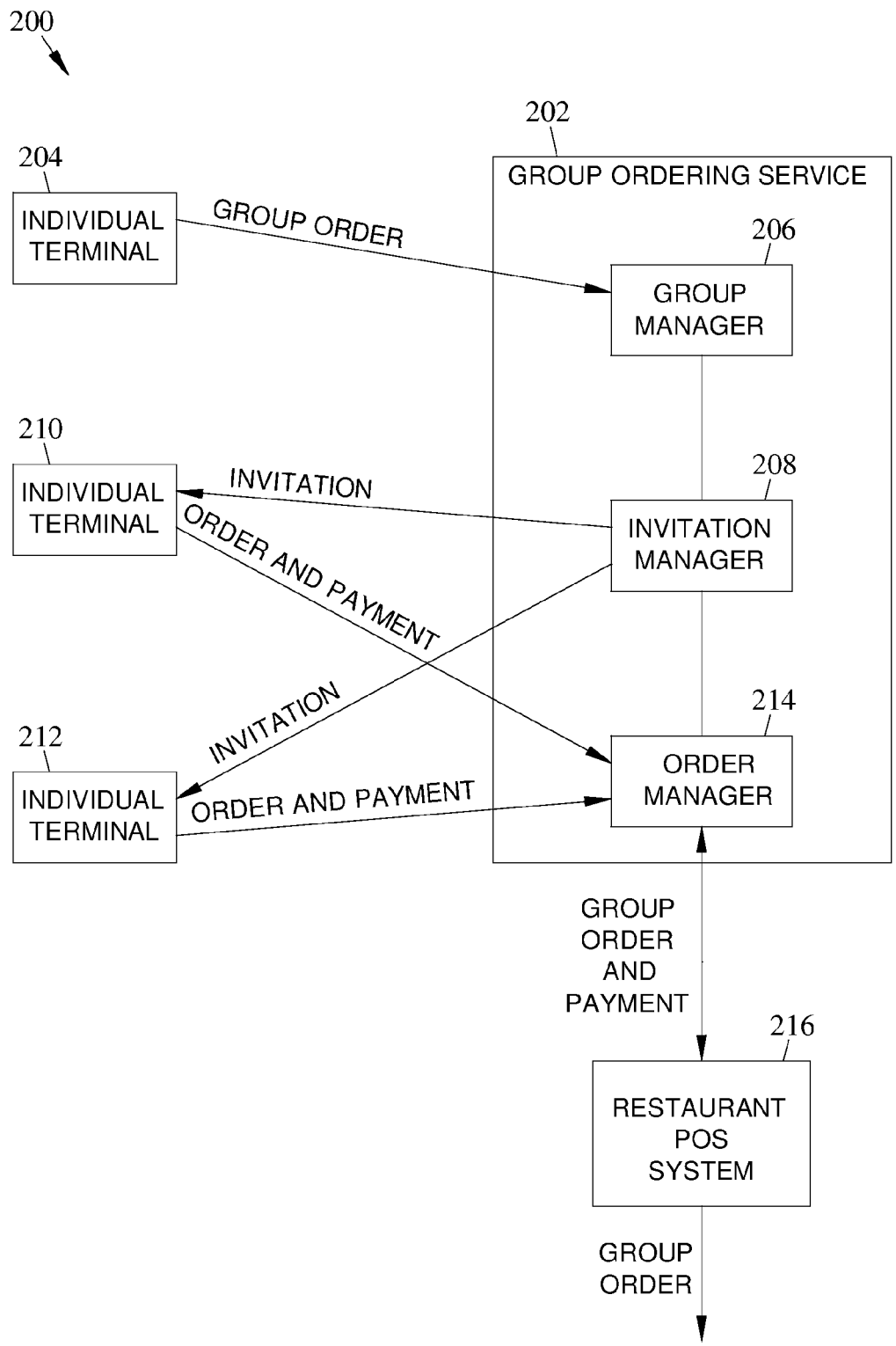
FIG. 2 is a block diagram illustrating an exemplary system for automatic online group ordering of food from a restaurant according to an embodiment of the subject matter described herein.

Returning to FIG. 1, in step 102, in response to the input, invitations are automatically and electronically sent to the individuals, inviting the individuals to participate in the group order. In FIG. 2, group manager 206 communicates the details of the group to an invitation manager 208. Invitation manager 208 sends invitations to individual terminals 210 and 212 inviting the individuals to participate in the group order. In one implementation, the invitation is sent via email. The email may include a link that allows the invitee to connect to order manager 214 and place the group order. The link may include a group order identifier usable by order manager 214 to identify individual orders associated with a group order. An example email will be described in detail below.

Returning to FIG. 1, in step 106, the individual orders are combined into a group order. Returning to FIG. 2, an order manager 214 may combine the individual orders into a group order. In one implementation, when the user of individual terminal 204 defines the group order, the user specifies a cut-off time and a ready time for the order. Identified individuals who respond by the cut-off time will be allowed to participate in the order. Individuals that respond outside of this time frame may be prevented from participating in the order.

Returning to FIG. 1, in step 108, the group order is automatically communicated to the restaurant. Automatically communicating the group order to the restaurant means that the group order is communicated to the restaurant without requiring intervention from the order creator. For example, at cut-off time, the individual orders that have been received as of the cut-off time may be combined and sent to the restaurant. Returning to FIG. 2, order manager 214 sends the group order to a restaurant point of sale system 216 or to another electronic device at the restaurant, such as a fax machine or an email account of the restaurant. Automatically communicating the group order to the restaurant in response to a predefined event, such as expiration of a time interval, allows the order to continue, even if some of the individuals, the order creator, or both are unavailable at the time the order is completed.

According to one aspect of the subject matter described herein, system 200 optionally allows the order creator to pay for the group order or to allow individual participants to pay for their respective portions. For example, group manager 206 may present the order creator with the option of paying for the group order or allowing the individuals to pay for their respective portions of the group order. Allowing the individuals to pay for their own orders reduces the need for one individual to collect payment from each individual participating in the order. Optionally allowing the order to be paid for by the creator or by the individuals increases flexibility over e-commerce systems that require the order to be paid for by the creator or by individual participants.

If the creator is paying for the group order, order manager 214 may allow the creator to review the order prior to completion. However, if individuals are paying for their respective portions of the order, order manager 214 may finalize the order automatically in response to expiration of the order time period, as described above.

In addition, if the creator is paying for the group order, order manager may allow the creator to specify spending limits for individual orders. Group manager 208 may prompt the creator for spending limits if the creator selects the option to pay for the entire order. Order manager 214 may enforce the spending limits for individual orders at the time of placement of the orders. For example, order manager 214 may send notification to an individual that a proposed order exceeds the spending limit for an order and prompt the individual to select another menu item.

Figure 3:
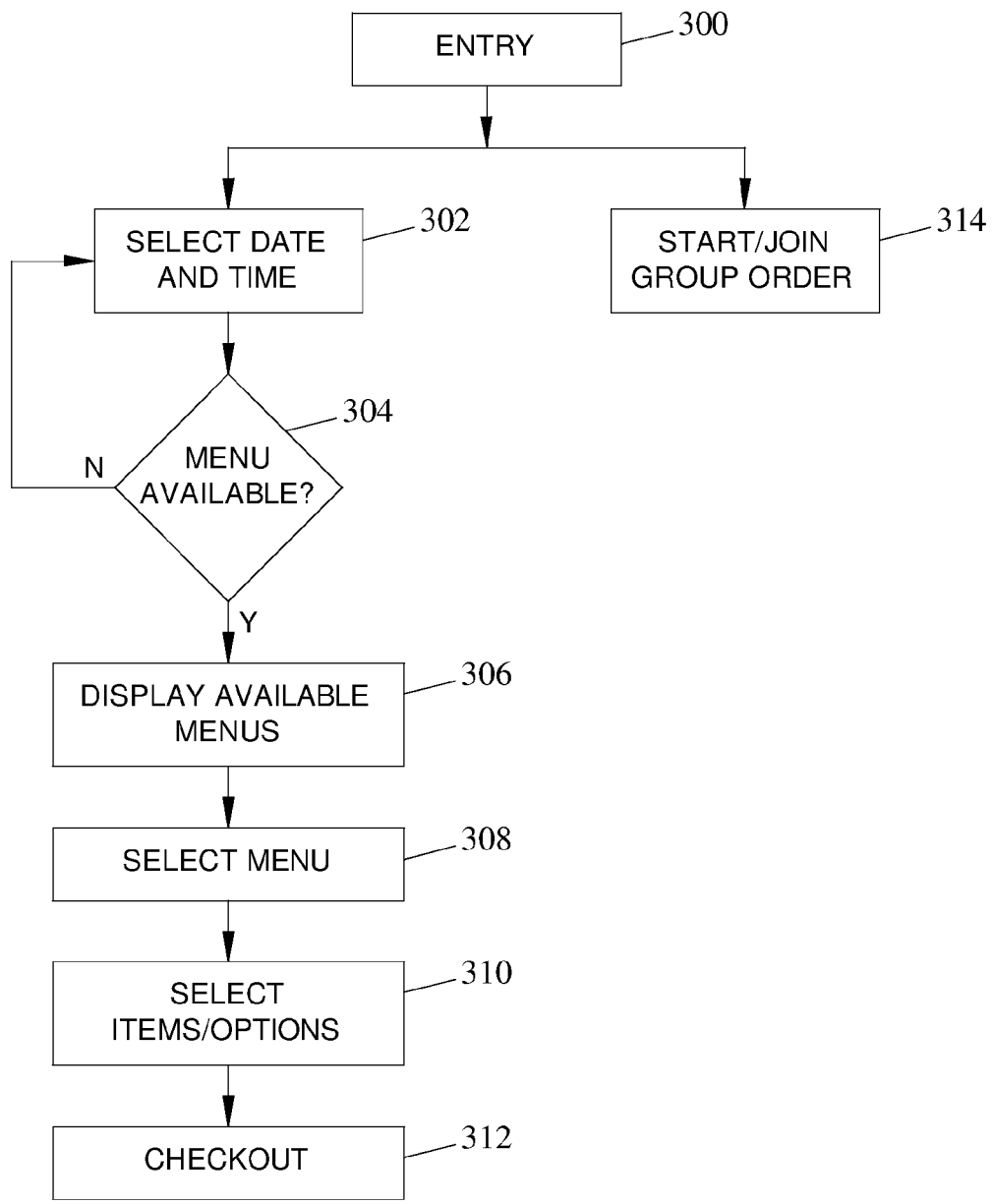
FIG. 3 is a flow chart illustrating exemplary steps of a process for automatically placing an online group order of food from a restaurant according to an embodiment of the subject matter described herein.

FIG. 3 is a flow chart illustrating an exemplary process that may be performed via an order entry screen for placing an online group order according to an embodiment of the subject matter described herein. Referring to FIG. 3, in step 300 the entry screen is displayed. If the user is an individual that is placing an individual online order that is not part of a group order, control proceeds to step 302 where the user selects the start time and ready time for the order. In step 304, it is determined whether a menu is available. If a menu is not available, control returns to step 302 for the user to enter a new date and time.

If the menu is available during the specified start time, control proceeds to step 306 where available menus are displayed. In step 308, the user selects the menu containing the items that the user desires to include in the order. In step 310, the user selects items or options from the menu. In step 312, a check out process is initiated for the individual.

Figure 4A:
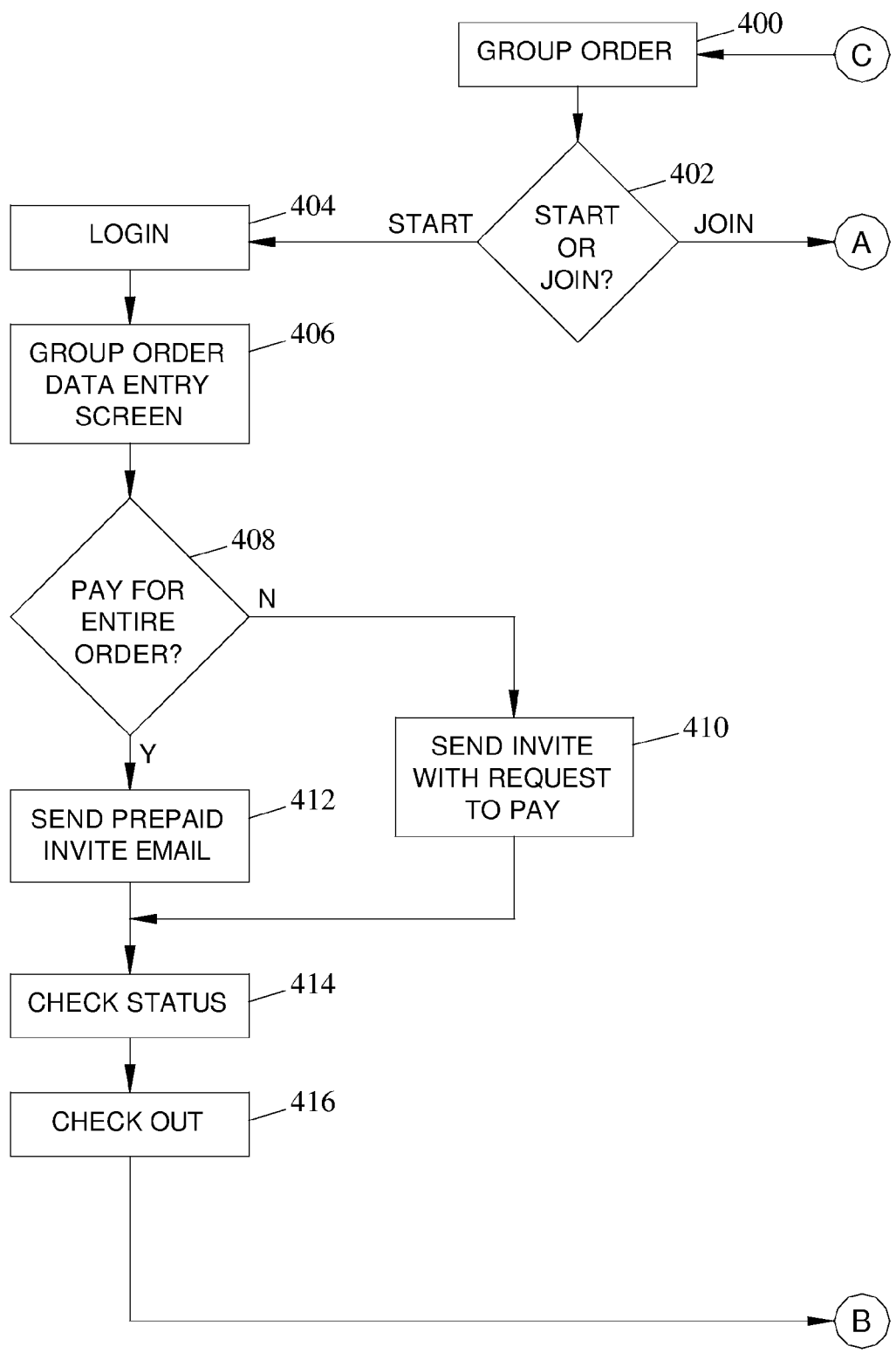
FIGS. 4A and 4B are a flow chart illustrating an exemplary process for starting or joining an automatic online group food order according to an embodiment of the subject matter described herein.
Figure 4B:
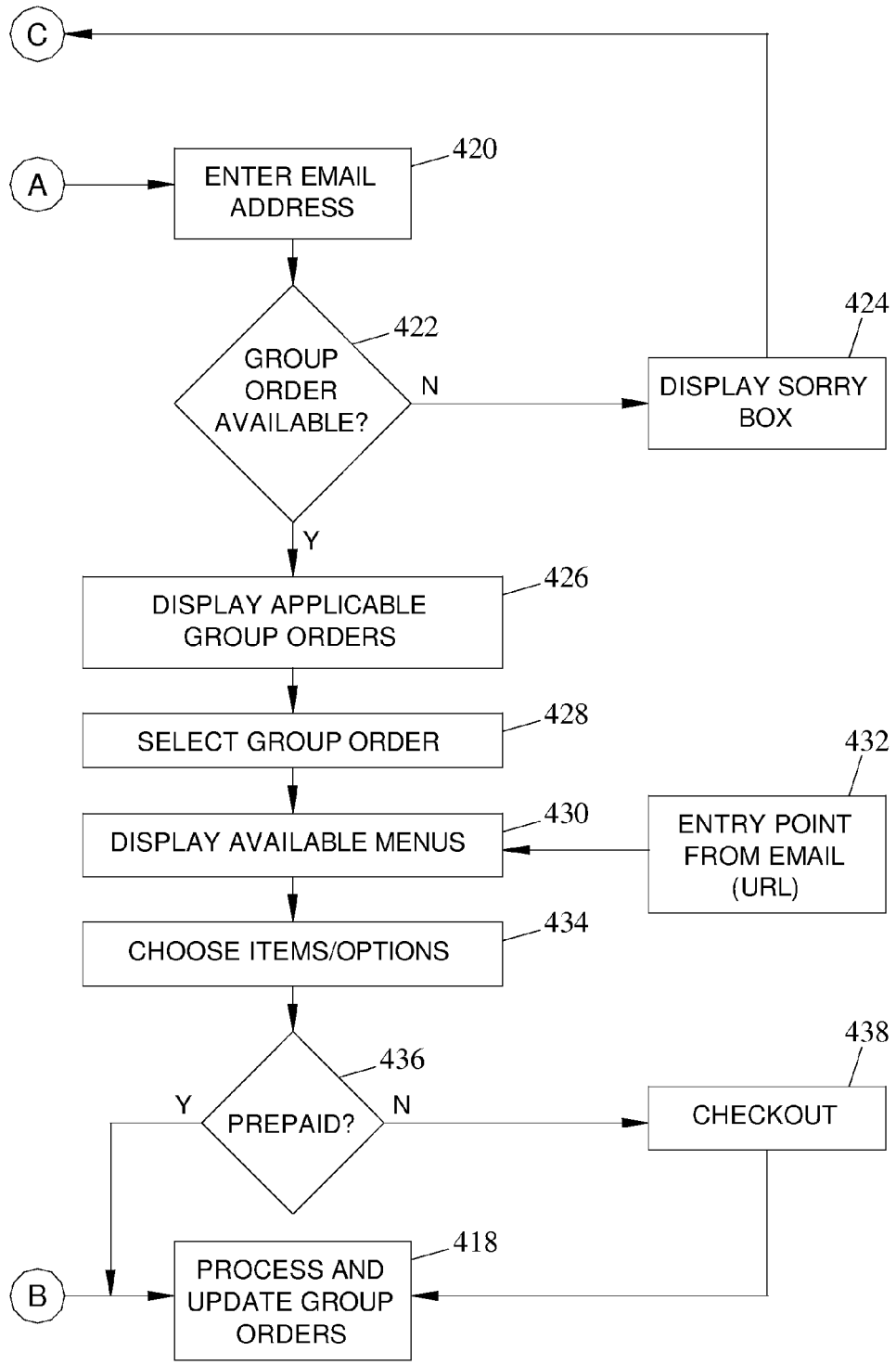
Figure 5:
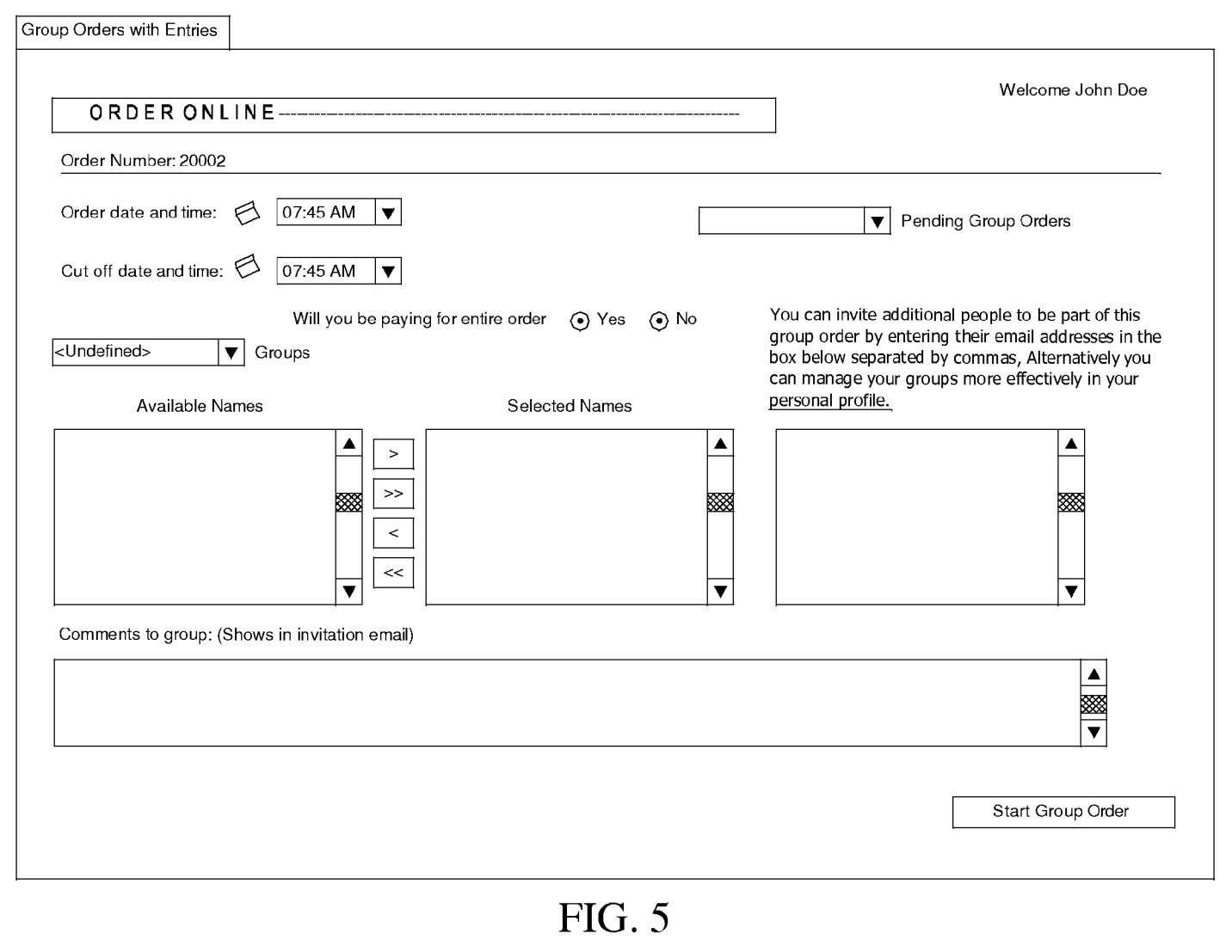

Returning to step 300, if the user desires to start a new group order or join an existing group order, control proceeds to step 314. FIGS. 4A and 4B are a flow chart illustrating an exemplary process for starting a new group order or joining an existing group order according to an embodiment of the subject matter described herein. Referring to FIGS. 4A and 4B, in step 400, the group order process starts. In step 402, it is determined whether the user is starting a new group order or joining an existing group order. If the user is starting a new group order, control proceeds to step 404 where the user logs in. In step 406, the user is presented with group order data entry screens. FIGS. 5 and 6 are examples of group order data entry screens that may be presented to a user. In FIG. 5, the user selects start times and end times for a group order. In addition, the user selects whether each individual or whether the creator will pay for the group order. The user can also select the individual names to be included in the group order. In FIG. 6, the user can define new members to be included in the group order.

Returning to FIG. 4, in step 408, it is determined whether the creator will pay for the entire order or not. If the creator does not pay, control proceeds to step 410 where an invite email is sent to each recipient with a request to pay. FIG. 7 illustrates an exemplary email message that includes an invite with a request for the individual to pay for the group order. In the email message, it is indicated that the individual is required to pay for the order when the order is placed. The email message also includes a link to a website through which the individual can place the group order. The link includes a group order identifier.

Returning to step 408, if the creator pays for the order, control proceeds to step 412 where an email is sent to each individual in the group inviting the individual to place an order, but indicating that the order has already been paid for by the creator. FIG. 8 is an example of such an email. In FIG. 8, the email message includes an indicator that the order has been paid for and also includes a link to a website through which the individual can place the group order. The link includes a group order identifier.

In step 414, the creator can check the status of the group order, i.e., if the invitees have placed their orders. In step 416, the creator can check out. In step 418, the system processes and updates group orders as events change.

Returning to step 402, if the user is joining an existing group order, control proceeds to step 420 where the user enters his or her email address. In step 422, it is determined whether a group order is available for the individual who entered the email address. If a group order is not available, control proceeds to step 424 where a message is displayed indicating that a group order is not available. Control then returns to step 400.

In step 422, if a group order is available for the individual who entered his or her email address in step 420, control proceeds to step 426 where available group orders are displayed. In step 428, the individual selects one of the available group orders. In step 430, menus are displayed to the individual. The individual may also enter step 430 via step 432 when the individual receives an email with a URL inviting the individual to participate in the group order. In step 434, the individual selects menu items.

In step 436, it is determined whether the order is a prepaid or a postpaid order. If the order is a prepaid order, control proceeds to step 418 where the individual order is added to the group and processed. If the order is not a prepaid order, control proceeds to step 438 where the individual is required to go through the check out process.

Figure 9:
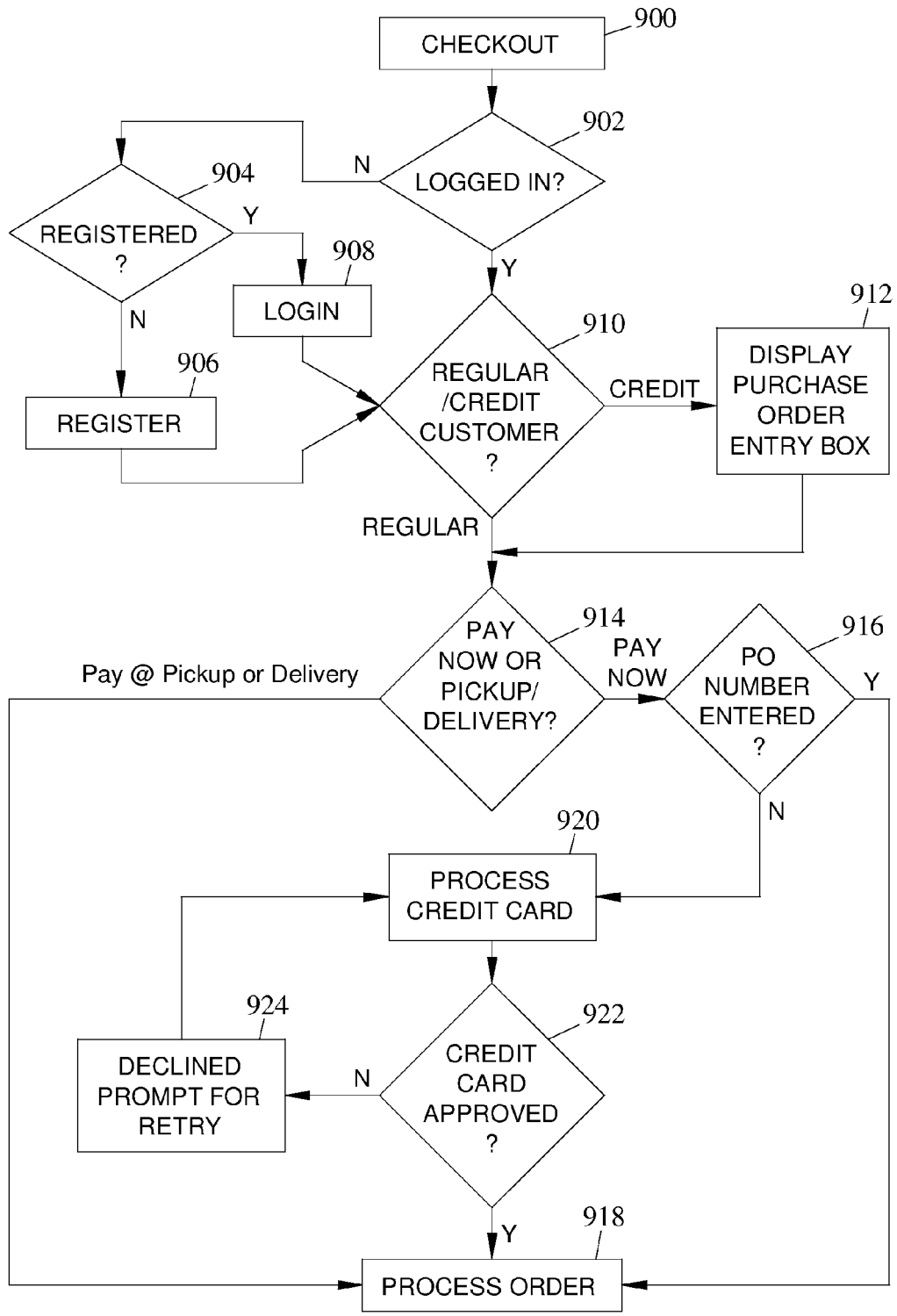
FIG. 9 is a flow chart illustrating an exemplary check out process for an automatic group online food order according to an embodiment of the subject matter described herein.

FIG. 9 is a flow chart illustrating exemplary steps of the check out process according to an embodiment of the subject matter described herein. Referring to FIG. 9, in step 900, the check out process is initiated. In step 902, it is determined whether the user is logged in. If the user is not logged in, control proceeds to step 904 to determine whether the user is a registered user. If the user is not a registered user, control proceeds to step 906 where the user enters the registration process and logs in. In step 904, if the user is registered but not logged in, control proceeds to step 908 where the user logs in.

Once the user is logged in, control proceeds to step 910 where it is determined whether the individual is a regular customer or a credit customer. If the customer is a credit customer, control proceeds to step 912 where the purchase order entry box is displayed. If the customer is a regular customer, control proceeds to step 914 where the user selects pay now or pay at pickup or delivery. If the user selects pay now, control proceeds to step 416 where it is determined whether the purchase order number has been entered. If the purchase order number has been entered, control proceeds to step 918 where the order is processed. If the purchase order number has not been entered, control proceeds to step 920 where the individual enters his or her credit card. In step 922, the system determines whether the credit card has been approved. If the credit card has been approved, control proceeds to step 918 where the order is processed. Returning to step 914, if the user selects pay at pick up or delivery, control proceeds to step 918 where the order is processed.

In step 922, if the user's credit card is not approved, control proceeds to step 924 where the user is prompted to retry the credit card information. Then, control returns to step 320 where the new credit card information is processed.

Figure 10:
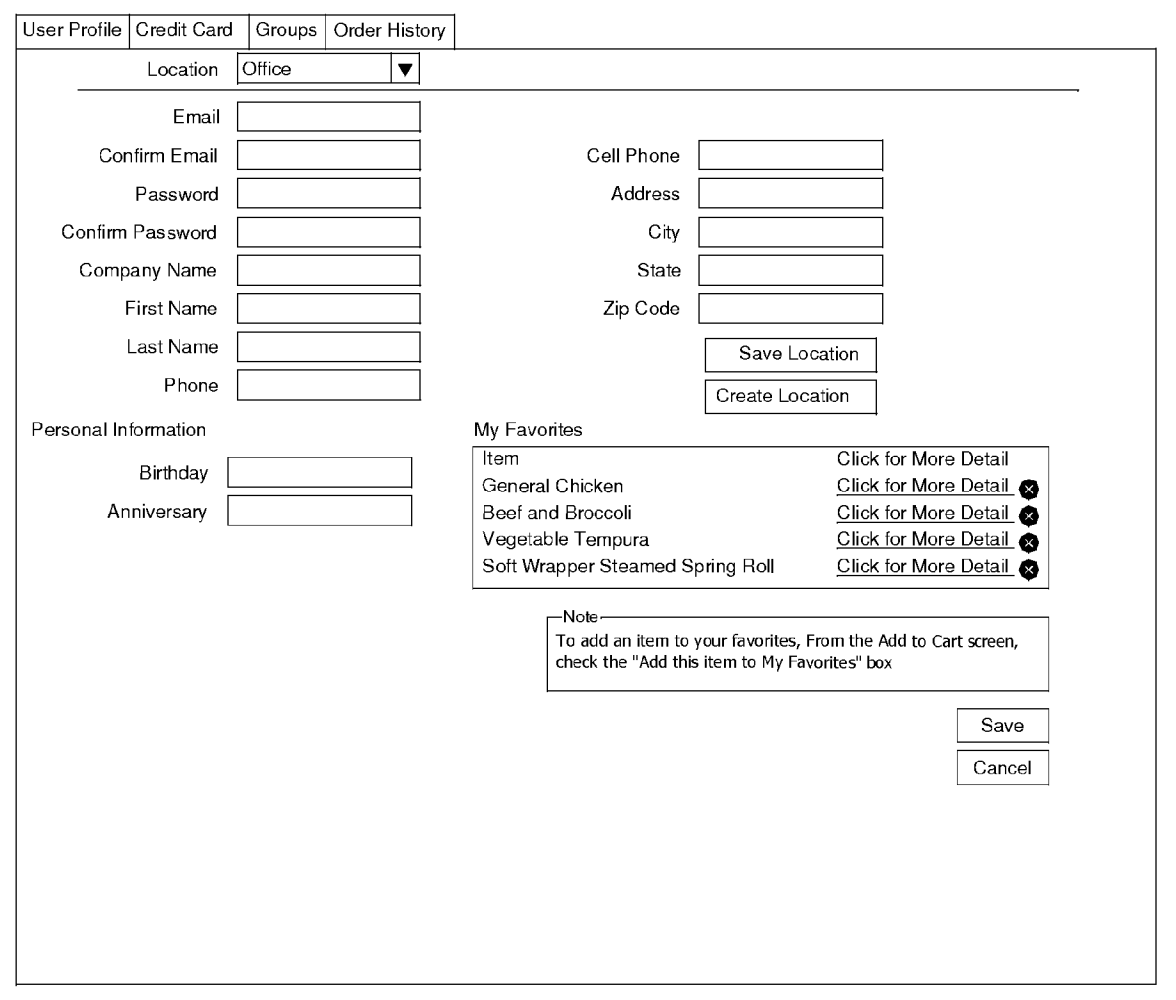

FIG. 10 is a drawing of an exemplary computer user interface screen where the user can create a user profile for online group ordering. The user profile allows the user to define his or her contact information, a password, and menu preferences.

The following scenarios illustrate exemplary operation of the subject matter described herein. The scenarios described below may be implemented by system 200 illustrated in FIG. 2 or by any suitable computer program product embodied in a computer readable medium, as described above.

Scenario 1:

An office manager initiates a group order from his favorite restaurant. He selects the order pickup time, the cut-off time, and chooses to pay for the entire order. He selects five previously invited individuals from his stored list in the system. He also enters two new email addresses for the two new employees that started today. Upon clicking "Start Group Order," the invitees are sent the invitation email. Four individuals join the order, and three choose not to as they had other plans. The initiator finalizes the order at cut-off time and pays for it using his credit card. The order is sent to the restaurant and prepared. The office manager asks one of the employees to pick up the food since it's already paid for.

Scenario 2:

An employee starts a group order from a restaurant and invites his two co-workers. He selects delivery time, cut-off time and chooses to only pay for his portion of the order. The two invitees click on the links in the invitation emails that they received, place their respective portions of the order, and pay for their portions with their own credit cards. The order is finalized and sent to the restaurant. The restaurant delivers the food to the location.

Scenario 3:

A car parts salesman wants to buy lunch for his contacts at three dealerships and drop the food off to them. He starts a group order and invites the three contacts. He chooses to pay for the entire order. The individuals place their respective portions of the order. The car parts salesman finalizes the order, pays for it via credit card, picks it up at the restaurant, and delivers the food to the three dealerships.

Scenario 4:

An office manager initiates a group order, chooses to pay only for his portion and invites six individuals. Five of the individuals place their respective portions of the order by clicking on the email link that they received and paying for their own food. The sixth individual is out of the office at a customer site and did not see his email. The office manager calls him and tells him about the group order. The individual goes to the restaurant website, logs in, joins the group order, and pays for his food. His food is at the office when he gets back.

Scenario 5:

An office manager needs to go out and run errands all morning. She would like to order lunch and pick it up on her way back to the office. She initiates a group order and invites five co-workers. She selects the option to force invitees to pay for their own food. She starts the order at 8:00 a.m., sets the pick up time for 12:00 p.m., and sets the cut-off time for 11:30 a.m. She pays for her portion of the order and heads out for her errands. Three of her co-workers join the order and pay for their food between 8:00 a.m. and 11:30 a.m. Another co-worker clicks on the link in his invitation email at 11:45 to join the group order. He is informed by the system that this group order is now finalized and further additions are not allowed. The fifth co-worker decides not to join the order and just ignores the invitation. At 11:30 a.m., the order is finalized automatically by the system and sent to the restaurant. The office manager stops by at 12:05 p.m. after her errands and picks up the food.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for effecting an automatic online group order of food from a restaurant, the method comprising:

at least one computing platform having a computer readable medium with computer executable instructions stored thereon for implementing automatic online group ordering of food from a restaurant:

presenting, to a user, an option to start a new group order or to join an existing group order, and, in response to the user selecting to create a new group order:

receiving, from the user, input for creating the new group online food order from a restaurant, the input including a list of individuals generated by the user at order creation time and a cut-off time for the order, wherein the list of individuals can include any individuals specified by the user at order creation time;

providing for the user to select, at order creation time, an option for the user to pay for the group order and to set spending limits for individual orders;

in response to the input, automatically and electronically sending invitations to the individuals inviting the individuals to participate in the group order;

receiving individual orders from at least some of the individuals;

automatically enforcing the spending limits for the individual orders at the time of placement of the individual orders;

combining the individual orders into the group order; and in response to the occurrence of a cutoff time, automatically combining the individual orders that have been received as of the cut-off time and communicating the combined individual orders as the group order to the restaurant even if some of the individuals have not joined the group order as of the cut-off time; and in response to receiving input from the user to join an existing group order:

determining whether a group order is available for the user to join;

in response to determining that a group order is available for the user to join, presenting the user with a list of at least one available group order;

receiving input from the user for selecting an available group order from the list;

in response to receiving user input selecting the available group order from the list, displaying a menu for the selected available group order;

receiving selection from the user of at least one item in the menu;

determining whether the selected available group order is prepaid or post paid; and in response to determining that the order is prepaid, adding the user's individual order to the selected available group order and processing the individual order as part of the selected available group order.

2. The method of claim 1 wherein receiving input includes presenting the user with a group selection screen via a web interface for selecting or defining the list of individuals.

3. The method of claim 1 wherein receiving input includes receiving the cut-off time and ready time for the group order.

4. The method of claim 3 wherein automatically communicating the group order to the restaurant includes sending the group order to the restaurant without intervention from the user in response to occurrence of the cut-off time.

5. The method of claim 1 wherein automatically and electronically sending invitations to the individuals to participate in the group order includes triggering, from a group ordering server, the sending of email messages to the individuals.

6. The method of claim 5 wherein receiving individual orders from at least some of the individuals includes presenting links in the email messages through which the individuals can place their respective orders.

7. The method of claim 6 wherein the links each include an order identifier for identifying the order and wherein combining the individual orders includes identifying individual orders made using the order identifier.

8. The method of claim 1 wherein automatically communicating the group order to the restaurant includes sending the group order to a restaurant point of sale system.

9. The method of claim 1 wherein automatically communicating the group order to the restaurant includes communicating the group order to the restaurant in response to expiration of an order time period without intervention by the user.

10. The method of claim 9 wherein automatically communicating the group order to the restaurant includes communicating the group order to the restaurant prior to receiving all of the individual orders in response to the cut-off time of the order.

11. A method for online group ordering of food from a restaurant, the method comprising:

at least one computing platform having a computer readable medium with computer executable instructions stored thereon for implementing automatic online group ordering of food from a restaurant:

presenting, to a user, an option to start a new group order or to join an existing group order, and, in response to the user selecting to create a new group order:

receiving, from the user, input for creating the new group online food order from a restaurant, the input including a list of individuals generated by the user at order creation time and a cutoff time for the order, wherein the list of individuals can include any individuals specified by the user at order creation time;

presenting, via an interface to the user, an option for the user to pay for the group order or to allow the individuals to pay for their respective portions of the group order;

receiving, at order creation time, input from the user via the interface selecting the option for the user to pay for the group order and setting spending limits for individual orders;

automatically and electronically sending invitations to the individuals inviting the individuals to participate in the group order;

receiving individual orders from at least some of the individuals;

automatically enforcing the spending limits for the individual orders at the time of placement of the individual orders;

combining the individual orders into the group order;

in response to occurrence of the cutoff time, allowing the user to review and pay for the group order;

automatically communicating the group order to the restaurant even if some of the individuals have not joined the group order by placing individual orders in response to the invitations; and in response to receiving input from the user to join an existing order:
  determining whether a group order is available for the user to join;
  in response to determining that a group order is available for the user to join, presenting the user with a list of at least one available group order;
  receiving input from the user for selecting an available group order from the list;
  in response to receiving user input selecting the available group order from the list, displaying a menu for the selected available group order;
  receiving selection from the user of at least one item in the menu;
  determining whether the selected available group order is prepaid or post paid; and
  in response to determining that the order is prepaid, adding the user's individual order to the selected available group order and processing the individual order as part of the selected available group order.

12. A system for automatic online group ordering of food from a restaurant, the system comprising:
  at least one computing platform having a computer readable medium with computer executable instructions stored thereon for implementing automatic online group ordering of food from a restaurant, the computer readable medium including:
  a group manager for presenting, to a user, an option to start a new group order or to join an existing group order, and, in response to the user for selecting to create a new group order:
    receiving, from the user, input for creating a group online food order from a restaurant, the input including a list of individuals and a cut-off time for the order, wherein the list of individuals can include any individuals specified by the user at order creation time, wherein the group manager further provides for the user to select, at order creation time, an option for the user to pay for the group order and to set spending limits for individual orders; and
    in response to receiving input from the user to join an existing group order:
      determining whether a group order is available for the user to join;
      in response to determining that a group order is available for the user to join, presenting the user with a list of at least one available group order;
      for receiving input from the user for selecting an available group order from the list;
      in response to receiving user input selecting the available group order from the list, displaying a menu for the selected available group order;
      receiving selection from the user of at least one item in the menu;
      determining whether the selected available group order is prepaid or post paid;
      in response to determining that the order is prepaid, adding the user's individual order to the selected available group order and processing the individual order as part of the selected available group order;
    an invitation manager for automatically and electronically sending invitations to the individuals inviting the individuals to participate in the group order; and
    an order manager for receiving individual orders from at least some of the individuals, for automatically enforcing the spending limits for the individual orders at the time of placement of the individual orders for combining the individual orders into the group order, and for automatically communicating the group order to the restaurant in response to the occurrence of a cutoff time even if some of the individuals have not joined the group order as of the cut-off time.

13. The system of claim 12 wherein the group manager is adapted to present a group selection screen to a user via a web interface for allowing the user to define or select group members.

14. The system of claim 12 wherein the group manager is adapted to receive the cut-off time and a ready time for the group order and wherein the order manager is adapted to allow individuals to participate in the group order who respond within the time period defined by the cut-off time.

15. The system of claim 14 wherein the order manager is adapted to automatically send the group order to the restaurant in response to occurrence of the cut-off time without intervention from the user.

16. The system of claim 12 wherein the invitation manager is adapted to invite the individuals to participate in the group order by sending emails to the individuals.

17. The system of claim 16 wherein each email includes a link for allowing the individual who receives the email to place an individual order via the order manager, the link including an order identifier for allowing the order manager to combine the orders received from the individuals into the group order.

18. The system of claim 12 wherein the order manager is adapted to communicate the group order to any of a point of sale system, a fax machine, and an email address of the restaurant.

19. A computer program product comprising computer executable instruction embodied in a non-transitory computer readable medium for performing the steps comprising:
  at least one computing platform having a computer readable medium with computer executable instructions stored thereon for implementing automatic online group ordering of food from a restaurant:
  presenting, to a user, an option to start a new group order or to join an existing group order, and, in response to the user selecting to create a new group order:
    receiving, from the user, input for creating the new group online food order from a restaurant, the input including a list of individuals generated by the user at order creation time and a cut-off time for the order, wherein the list of individuals can include any individuals specified by the user at order creation time;

providing for the user to select, at order creation time, an option for the user to pay for the group order and to set spending limits for individual orders;

in response to the input, automatically and electronically sending invitations to the individuals inviting the individuals to participate in the group order;

receiving individual orders from at least some of the individuals;

automatically enforcing the spending limits for the individual orders at the time of placement of the individual orders;

combining the individual orders into the group order; and in response to the occurrence of a cutoff time, automatically communicating the group order to the restaurant even if some of the individuals have not joined the group order as of the cut-off time; and in response to receiving input from the user to join an existing order:

determining whether a group order is available for the user to join;

in response to determining that a group order is available for the user to join, presenting the user with a list of at least one available group order;

receiving input from the user for selecting an available group order from the list;

in response to receiving user input selecting the available group order from the list, displaying a menu for the selected available group order;

receiving selection from the user of at least one item in the menu;

determining whether the selected available group order is prepaid or post paid; and in response to determining that the order is prepaid, adding the user's individual order to the selected available group order and processing the individual order as part of the selected available group order.

20. The method of claim 1 comprising storing a list of previous invitees of the user and allowing the user to select the previous invitees of the user in creating the group food order.

21. The method of claim 1 wherein the input for creating group order originates from a first individual terminal and wherein the invitations are sent to individual terminals separate from the first individual terminal.

22. The method of claim 11 comprising storing a list of previous invitees of the user and allowing the user to select the previous invitees in creating the group food order.

23. The method of claim 11 wherein the input for creating group order originates from a first individual terminal and wherein the invitations are sent to individual terminals separate from the first individual terminal.

24. The system of claim 12 wherein the group manager stores a list of previous invitees of the user and allows the user to select the previous invitees in creating the group food order.

25. The system of claim 12 wherein the input for creating group order originates from a first individual terminal and wherein the invitations are sent to individual terminals separate from the first individual terminal.

26. The computer program product of claim 19 comprising storing a list of previous invitees of the user and allowing the user to select the previous invitees of the user in creating the group food order.

27. The computer program product of claim 19 wherein the input for creating user originates from a first individual terminal and wherein the invitations are sent to individual terminals separate from the first individual terminal.

* * * * *